Feb. 24, 1959 H. B. SEDGFIELD ET AL 2,874,578
TORQUE-APPLYING DEVICES

Filed Nov. 14, 1955 2 Sheets-Sheet 1

INVENTORS
HUGH BROUGHAM SEDGFIELD
RONALD WHALLEY
BY
ATTORNEY

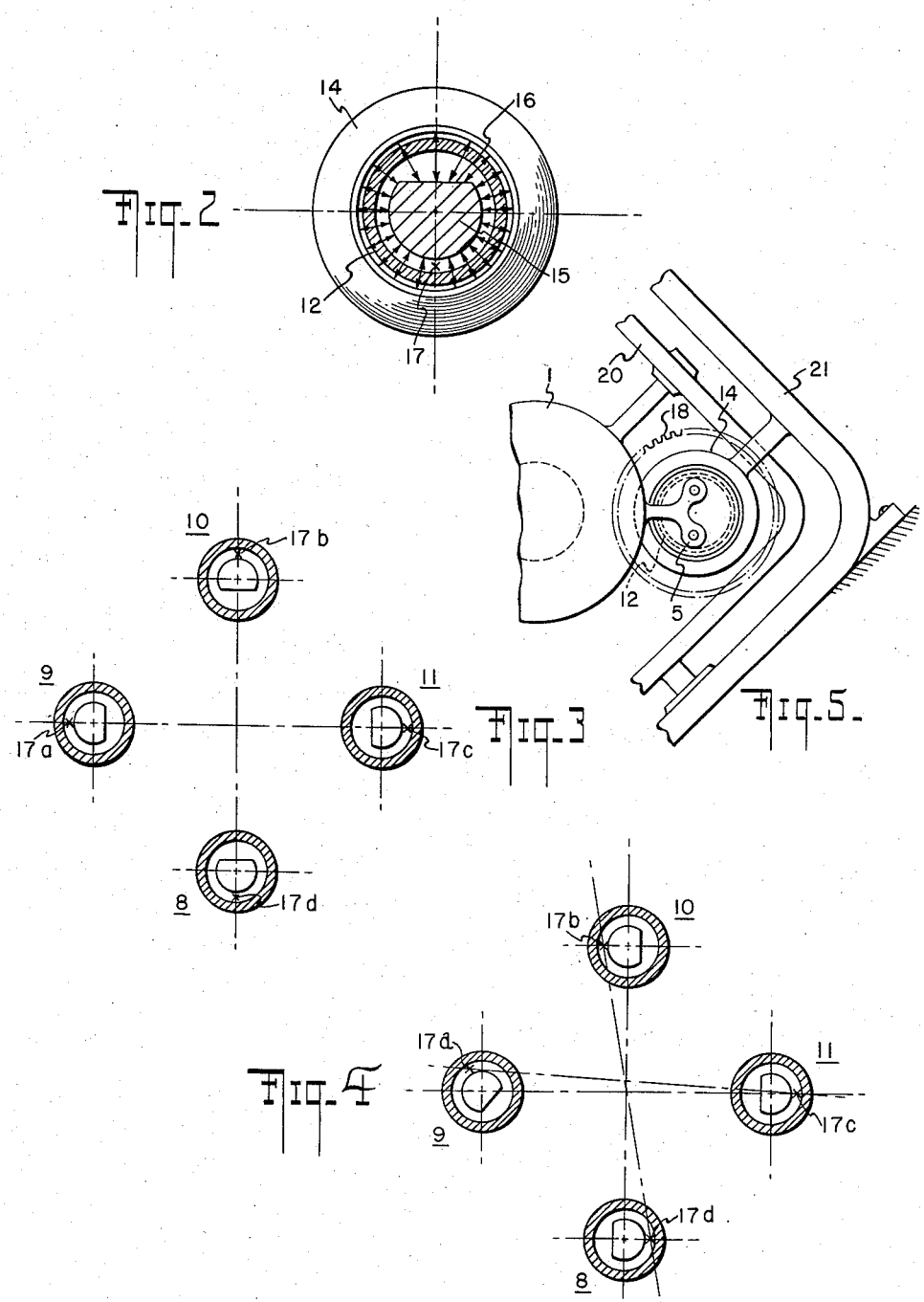

United States Patent Office 2,874,578
Patented Feb. 24, 1959

2,874,578

TORQUE-APPLYING DEVICES

Hugh Brougham Sedgfield, Hampton, and Ronald Whalley, Whitton, England, assignors to The Sperry Gyroscope Company Limited, Brentford, England, a company of Great Britain Application November 14, 1955, Serial No. 546,737

Claims priority, application Great Britain November 15, 1954

8 Claims. (Cl. 74—5.4)

This invention relates to apparatus of the kind comprising a rigid body, a base, an electro-mechanical force applier or a set of electro-mechanical force appliers each having a coil mounted in rigid relation to the rigid body and a magnet mounted on the base and in operative relation with the coil whereby when the coil of the force applier is energised or the coils of the set of force appliers are simultaneously energised the force appliers exert forces between the rigid body and the base, and a supporting system supporting the rigid body from the base and adapted to allow the rigid body to respond through a limited range to the net torque about any axis parallel to a predetermined plane which results from the force or forces impressed on the rigid body by the force appliers, the force of gravity, and the reactive force impressed on the rigid body by the supporting system.

The invention has application to gyroscopic apparatus wherein the rigid body comprises a casing or frame supporting the rotor of a gyroscope and the supporting system may comprise a system of gimbals providing two mechanical axes which are usually co-planar, mutually perpendicular, and normally approximately perpendicular to the gyroscope rotor axis.

In such gyroscopic apparatus, where it is desired to apply torques to the gyroscope casing about mutually perpendicular axes, it is a common practice to mount one torque motor between the casing and the gimbal ring on the inner of the two mechanical axes, and a second torque motor between the gimbal ring and the base on the outer of the two mechanical axes. With this arrangement the torques impressed by the respective motors on the gyroscope casing are about axes which are precisely determined by the construction of the gimbals and which lie along the respective mechanical axes of the gimbals.

However, the rotors of both torque motors, and the stator of one, move with the gyroscope casing, and this has the effect of reducing the proportion of "live" to "dead" weight in the movable parts of the gyroscope. In order to reduce the proportion of "dead" weight in the gyroscope, it has been proposed to employ, instead of torque motors, electro-mechanical force appliers very similar in construction to the moving coil and pot magnet employed in moving-coil loud speakers, the coils, which are extremely light in weight, being secured to the gyroscope casing, while the relatively heavy magnets are mounted on the support. A single force applier of this type does not of itself produce a torque, of course, but a torque results from the force exerted by the force applier in combination with some other force or forces such as the reactive force of the supporting system and/or forces exerted by additional force appliers.

Thus the moving coil and pot magnet arrangement constitutes an effective means of applying precessing torques to the gyroscope, and has the advantage, as compared with the arrangement of torque motors associated with the mechanical axes of a gimbal system in the manner described, of adding very little weight to the moving parts of the gyroscope. Another advantage of this arrangement is that the torque impressed on the gyroscope is more nearly proportional to the energizing current than it is when the usual kind of torque motor is employed. However, the axes about which the precessing torques are impressed on the gyroscope are no longer determined by the construction of the supporting system, since the force appliers act directly between the base and the rotor casing.

It is difficult to ensure, in the manufacture of such force appliers, merely by close accuracy in the manufacture of the parts of the apparatus, that the force appliers will have precisely uniform and predictable operating characteristics. In particular, the line of action of the resultant force exerted between the magnet and the coil, tends to be not precisely co-linear with the axis of the force applier. Thus the designer may arrange a set of force appliers with their axes all in one plane with the intention of obtaining a resultant torque about an axis perpendicular to that plane. However, if the lines of action of the forces exerted by one or more of the force appliers lie outside of this plane, it is likely that there will be a component of torque about some axis lying in the plane. In other words, the resultant torque will not act about an axis directed precisely as intended by the designer.

It is one object of the present invention to enable the directions of the axes about which torques are applied by electro-mechanical force appliers to be adjusted. In this way, inaccuracies in the directions of such axes due to non-uniform characteristics in the force appliers can be reduced or eliminated.

According to the invention, apparatus of the kind specified is provided with means for adjusting the magnet or at least one of the magnets to vary the line of action of the force occurring between the coil and the magnet and in this manner to adjust the direction of the axis of the resultant torque.

According to a second aspect of the invention, in an electro-mechanical force applier for use in apparatus of the kind specified and comprising a magnet and a coil, the magnet being in the form of a hollow cup with a central post or pillar extending axially within the cup from the closed end thereof, a rim at the open end of the cup and the free end of the pillar respectively providing the two poles of the magnet, and the coil being adapted to be supported co-axially between the rim of the cup and the free end of the pillar, the flux across the air gap between the cup rim and the pillar is distributed in a notably non-uniform manner circumferentially of the gap and means is provided for adjusting the rotational position of the non-uniform flux pattern about the axis of the cup whereby the position of the line of action of the resultant force impressed upon the coil is adjusted.

In order that the invention may be clearly understood and readily carried into effect, a specific embodiment thereof will now be described by way of example with reference to the accompanying drawings. In the drawings:

Fig. 2 is a section through a force applier forming part of the assembly shown in Fig. 1;

Figs. 3 and 4 are diagrams illustrating the manner in which the invention operates, and Fig. 5 is a partial end elevation view of the casing, supporting means and base elements of the gyroscopic apparatus.

Figure 1:
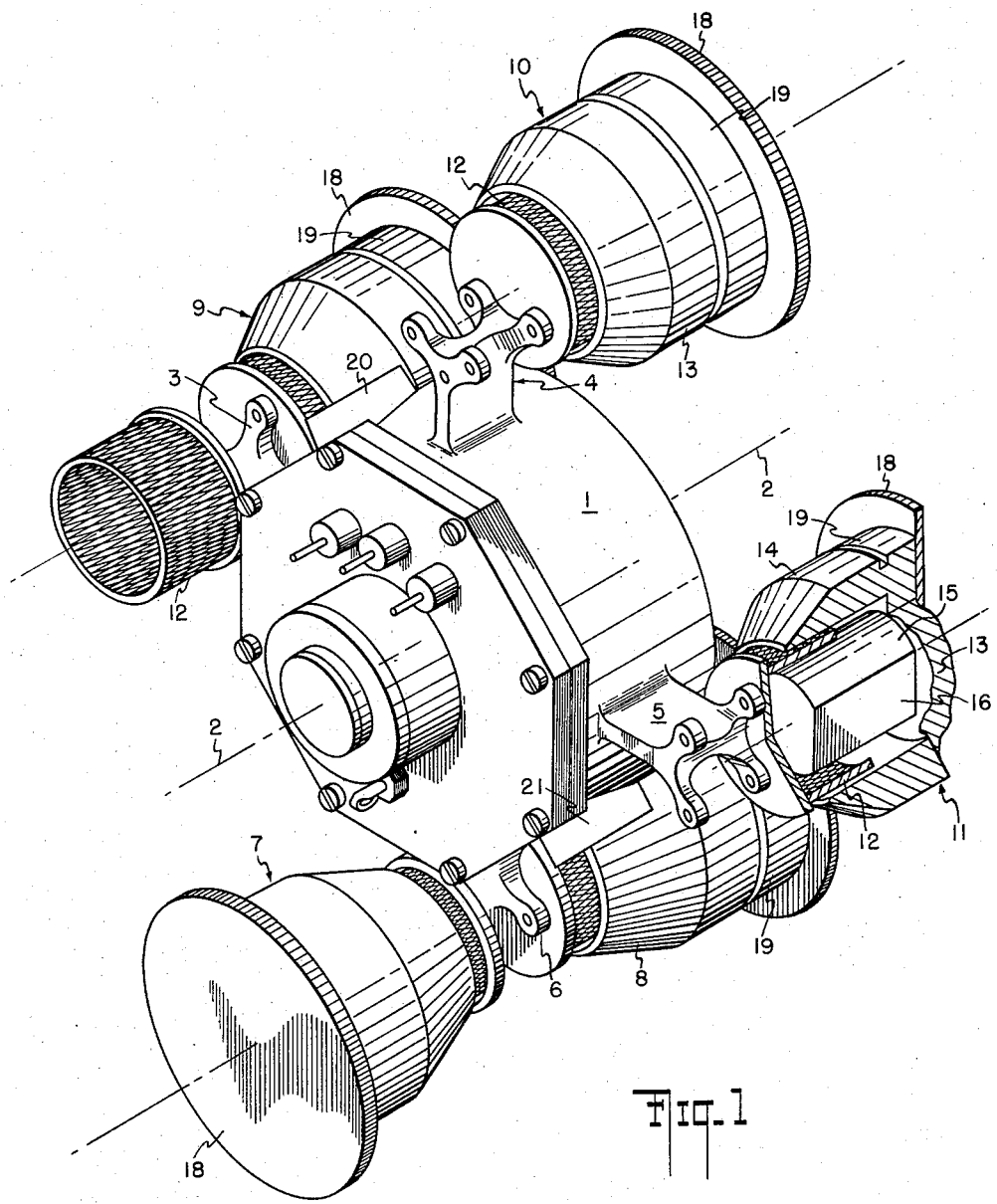
Fig. 1 is a perspective view showing the invention applied to a gyroscope, certain parts being omitted or sectioned.

Referring first to Figs. 1 and 5, a gyroscope rotor enclosed within a casing 1 is carried by suitable supporting means such as gimbal 20 or a ligament suspension so as to be freely rotatable through a small range about any axis which is perpendicular to the axis 2 of the gyroscope and passes through the centre of gravity of the assembly comprising the gyroscope rotor, the casing, and the parts movable with the casing.

Eight force appliers, arranged in pairs, are arranged to apply forces to brackets 3, 4, 5 and 6, to precess the gyroscope. These brackets are arranged symmetrically about two mutually perpendicular axes, through the centre of gravity of the rotor-casing assembly and perpendicular to the rotor axis 2.

The figure shows four of the force appliers complete; namely 7 and 8 associated with bracket 6, and 9 and 10 respectively associated with brackets 3 and 4. A force applier 11 is shown in section and associated with bracket 5, bracket 3 has the coil element alone of one of the associated force appliers, while one force applier is entirely omitted from brackets 4 and 5 in order to make the drawing clearer.

Each force applier is very similar to the moving coil arrangement commonly employed in loud speakers, and consists of a coil 12 embedded in a cylinder or cup of plastic, and a "pot" magnet 13 in the form of a cup 14 and a central post 15. Each bracket has two coils 12 mounted upon it, while the associated pot magnets 13 are mounted on a fixed base 21. Each coil lies in the annular air gap between the poles of the associated pot magnet. Hence when a current is passed through any coil, a force is exerted tending to move the coil axially in relation to the magnet, in a sense dependent on the polarity of the magnet and the current direction.

The force appliers, associated with brackets 4 and 6 have their coils so connected as to be energised simultaneously and in such a manner that the coils of force appliers 7 and 8 are urged in the same sense parallel to the axis 2, while the coils of the force applier 10 and the other force applier (not shown) associated with bracket 4 are both urged parallel to the axis 2 in the opposite sense to the coils of force appliers 7 and 8. Thus, when the coils of the set of force appliers associated with brackets 4 and 6 are energised, the four force appliers act together to apply a resultant precessing torque on the rotor casing 1 about an axis through brackets 3 and 5. In a similar manner, the coils of the force applier associated with brackets 3 and 5 are connected so that the force appliers act together to produce a resultant precessing torque about an axis through brackets 4 and 6 when their coils are energised.

As already mentioned, it is very difficult to construct a quantity of force appliers of the kind described in which the operating characteristics are precisely uniform and predictable. In particular, there is a tendency for the line of action of the resultant force exerted by a force applier to lie not exactly along the axis of the force applier, but parallel thereto.

If the resultant forces applied by each of the four force appliers of a set act in a plane through the centre of gravity of the moving system and the centre at which it is supported, the torque resulting from the four forces must lie about an axis perpendicular to that plane. If, however, the line of one of the forces lies outside but parallel to such plane, a component of torque will be exerted about some axis lying in the plane. In other words the resultant torque will not lie precisely perpendicular to the plane. Thus a force applier having a line of action which departs from the exactly axial position tends to introduce an error into the direction of the axis about which torque is applied to the gyroscope.

In accordance with the invention, provision is made for adjusting the lines of action of the forces exerted by the force appliers. This provision enables the torque axis to be brought perpendicular to the desired plane by adjusting the lines of action of the force appliers so that they all lie in that plane. Alternatively the torque axis can be brought perpendicular to the desired plane by adjusting the lines of action so that they are suitably balanced about all axes in the plane. Further, if the forces together have any linear resultant, such resultant will lie in the plane. For this reason it is normally essential that the plane to which the forces are related should pass through the centre of support provided by the gimbals or other supporting system, or the linear resultant, if it exists, will produce an undesired torque by acting about the centre of support.

If order to enable their lines of action to be adjusted, the force appliers are deliberately constructed with an eccentrically positioned line of action which can be adjusted into various rotational positions around the axis of the force applier.

As can be seen from examination of the sectioned force applier 11 in Fig. 1, the central post 15 of the pot magnet 13 is formed with a flat 16. Fig. 2 shows a transverse section of the force applier taken just level with the rim of the cup and looking towards the magnet. Owing to the increased width of the air gap in the region of the flat, the lines of force between the poles of the magnet are more closely spaced in the part of the air gap remote from the flat 16. The line of action of the resultant force on the coil, therefore, is along an axis which is displaced from the axis of the electrical coil of the force applier to some position such as 17. The flux lines in the generally annular gap provided between the pole pieces of the magnet are directed radially of the pivot axis of the magnet on the base.

Each magnet 13 has a gear 18 secured co-axially thereto, and is provided with a bearing surface 19 which engages a bearing in a plate (not shown) forming part of the base. Means engaging the surface of the gear wheel 18 remote from the magnet maintains the bearing surface 19 in appropriate relation with the bearing. A manual adjusting knob, or the equivalent (not shown) is arranged to adjust the magnet into any rotational position about its axis by way of a gear or train of gears (not shown) meshing with gear 18. The adjusting knobs are arranged to be conveniently accessible after the instrument base, the rotor casing containing the rotor, the supporting system and the force appliers are properly assembled. Thus the optimum adjustment of the magnets of the force appliers can be arrived at conveniently by testing the performance of the gyroscope when the force appliers are energised.

The manner in which the invention operates can be better understood by first considering four force appliers only, as shown in Figs. 3 and 4. In Fig. 3, the posts 15 are all arranged with the flats directed accurately inwards. The lines of action of the forces exerted on the coils happen, in this instance, to lie precisely opposite to the flats, hence the lines of action 17a and 17c lie in the plane through the axes of force appliers 9 and 11 and together exert a resultant torque about an axis in the plane through the axes of the force appliers 8 and 10 of the other set. Similarly, force appliers 8 and 10 exert a resultant torque about an axis in the plane through the axes of force appliers 9 and 11 of the first set.

In Fig. 4, the post of force applier 9 has been rotated so that the line of action 17a has moved out of the plane through the axes of force appliers 9 and 11. Assuming equal forces exerted by force appliers 9 and 11, and hence no torque producing reaction of the centre of support, the torque exerted by force appliers 9 and 11 is now about an axis perpendicular to the plane through lines of action 17a and 17c. The posts of force appliers 8 and 10 are shown turned approximately at right angles from the positions they have in Fig. 3, so giving the maximum possible angular difference between the plane in which the forces act and the plane through the axes of force appliers 8 and 10.

Now let it be supposed that when the posts 15 are arranged as in Fig. 3, the lines of action of the force appliers do not lie precisely in the desired planes, due to the line of action of one or more of the force appliers not being located precisely symmetrically in relation to the flat 16. As will be clear from the foregoing explanation, rotation of the appropriate one of the magnets 13 can be performed to bring the line of action into the desired plane.

There may be other reasons for adjusting the force appliers than undesired variations in the positions of the lines of action of the resultant forces which they produce. The axes of the force appliers might be located with insufficient accuracy, or it might be desired to direct the axes about which torques are exerted accurately in relation to the axes of some other instrument associated with the gyroscope.

When four force appliers act about each torque axis, as in the present embodiment, then the resultant force exerted by two force appliers of an aligned pair (such as 7 and 8 in Fig. 1) will lie along a line spaced between the separate lines of action of the two force appliers. Provided neither force applier has reached the limit of its range of adjustment, the resultant line of action of the pair of force appliers can be moved by adjusting either force applier. However, it is preferable, as far as possible, to keep the lines of action of the two force appliers in a common plane perpendicular to the desired torque axis, as any differential variation between the forces exerted by the force appliers which may occur within the possible range of movement will cause the resultant line of action of the pair of force appliers to move in relation to the force appliers if the lines of action of the force appliers considered separately are not co-linear.

The direction of the axis about which torque is exerted by the set of four torque appliers can be rotated in the plane transverse to the force appliers by adjusting one or both force appliers of either pair. However, it is normally desirable to select for adjustment that pair of force appliers having the resultant line of action which is further from the plane through the centre of support which is perpendicular to the desired torque axis. Then, if the force appliers together produce any resultant linear force, such force will tend to act through the centre of support and will not produce an erroneous torque component.

If the supporting system provides mechanical axes, these may be positioned anywhere in that plane through the centre of gravity of the rotor-casing assembly which is normally perpendicular to the rotor axis, provided such axes are mutually at a substantial angle to each other, preferably 90°. In the present embodiment the casing 1 may conveniently be rotatably mounted on a gimbal ring about an axis through bosses 20 and 21, that is to say, an axis directed at 45° to the approximate directions of the axes about which torque is exerted by the respective two sets of force appliers.

The embodiment hereinbefore described may be modified in various ways without departing from the scope of the invention. For example, the number of force appliers forming a set could be reduced from four to two, or one. Where the set comprises one force applier alone, the torque is effected by the action of the force produced thereby about a centre of support provided by the gimbals or other supporting system. The torque applied to the gyroscope casing is then perpendicular to the plane containing the centre of support and the line of action of the force exerted by the force applier. By moving the line of action of that force, the plane can be swung through a small angle around the centre of support, and the direction of the torque axis changed correspondingly.

The force appliers also may be modified in various ways while remaining within the scope of the invention. The post or pole piece, instead of having a flat could be in the form of a notched cylinder, or a cylinder having an eccentric axis about which it rotates within the cup portion of the magnet. Again, a bridge of magnetic material may be provided in the vicinity of a circumferential portion of the air gap which partly bypasses the flux path across the air gap at that circumferential portion of the coil and thus results in an uneven flux distribution. Instead of arranging the pot magnet to rotate as a whole, the post alone, or the post with the bridge secured thereto may be made rotatable to enable the non-uniform flux pattern, and the line of action of the resultant force, to be rotated about the axis of the force applier.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyroscopic apparatus having a rotor casing, a base, and means for supporting the casing on the base; a torque applying device operable to exert a force directly between the base and casing including an energizable electrical coil carried by said casing, and a magnet located on said base having spaced pole pieces providing an air gap encircling the electrical axis of the coil across the which radial lines of flux are distributed in a non-uniform pattern to locate the force line of action of the device in a direction displaced from the coil axis.

2. Apparatus as claimed in claim 1, in which the relation between the magnet and base is such as to facilitate rotational adjustment of the magnet about the coil axis and thereby vary the location of the force line and the axis of the resultant torque.

3. In a gyroscopic apparatus having a rotor casing, a base, and means for universally supporting the casing on the base; torque applying means operable to exert a resultant force directly between the base and casing including a plurality of simultaneously energizable electrical coils carried by said casing in symmetrically spaced relation, and a magnet for each of said coils located on said base having spaced pole pieces providing an air gap encircling the electrical axis of the related coil across which radial lines of flux are distributed in a non-uniform pattern to locate the force line of action of each coil and magnet in a direction displaced from the coil axis, said base and each of said magnets being related to facilitate individual adjustment thereof about the coil axis and thereby vary the location of the individual force lines, the resultant force and the axis of the resultant torque.

4. Apparatus as claimed in claim 3, in which the adjustment of the individual magnets is such that the resultant force lies in a plane that passes through the center of support of the universal supporting means of the casing.

5. Apparatus as claimed in claim 3, including a second torque applying means of the same character as the first torque applying means with the elements thereof arranged on the base and casing to provide a second adjustable torque axis that is at a substantial angle to the adjustable torque axis of the first torque applying means.

6. In a gyroscopic apparatus of the character in which a rotor casing is supported on a base; an electro-mechanical force exerting device comprising a coil on the casing and a magnet pivotally mounted on the base having a cup-shaped external pole piece and a generally cylindrical internal pole piece providing an annular gap receiving the coil in which flux lines directed radially of the pivotal axis of the magnet are distributed in a non-uniform pattern.

7. Apparatus as claimed in claim 6, in which a portion of the cylindrical internal pole piece is flattened to provide the flux distribution pattern in the gap.

8. Apparatus as claimed in claim 6, in which adjustment of the magnet about its pivotal mounting moves the force line of action of the device about the fixed electrical axis of the coil.

References Cited in the file of this patent

UNITED STATES PATENTS

| | | |
|---|---|---|
| 2,406,845 | Moore | Sept. 3, 1946 |
| 2,418,032 | Jewell | Mar. 25, 1947 |
| 2,527,245 | Cunningham et al. | Oct. 24, 1950 |
| 2,618,159 | Johnson et al. | Nov. 18, 1952 |
| 2,700,739 | Orlando | Jan. 25, 1955 |
| 2,714,311 | Dobson et al. | Aug. 2, 1955 |
| 2,716,345 | Grimshaw | Aug. 30, 1955 |